US010039274B2

(12) United States Patent
Raisbeck et al.

(10) Patent No.: US 10,039,274 B2
(45) Date of Patent: Aug. 7, 2018

(54) CONTAINER AND RETAINING SYSTEM

(71) Applicant: Flambeau, Inc., Baraboo, WI (US)

(72) Inventors: James A. Raisbeck, Middleton, WI (US); William J. Schulz, Baraboo, WI (US)

(73) Assignee: FLAMBEAU, INC., Baraboo, WI (US)

( * ) Notice: Subject to any disclaimer, the term of this patent is extended or adjusted under 35 U.S.C. 154(b) by 418 days.

(21) Appl. No.: 14/754,294

(22) Filed: Jun. 29, 2015

(65) Prior Publication Data

US 2016/0376064 A1   Dec. 29, 2016

(51) Int. Cl.
*A01K 97/10* (2006.01)
*A01K 97/08* (2006.01)

(52) U.S. Cl.
CPC .............. *A01K 97/10* (2013.01); *A01K 97/08* (2013.01)

(58) Field of Classification Search
CPC ........ A01K 97/06; A01K 97/08; A01K 97/10; Y10S 224/92; Y10S 224/922; A45C 11/20; A45C 13/26
USPC ....... 206/216, 315.1, 315.11, 315.2; 43/21.2, 43/25.2, 26, 54.1; 224/920, 922; 220/735, 752, 762; 190/102; D3/260, D3/905
See application file for complete search history.

(56) References Cited

U.S. PATENT DOCUMENTS

| | | | | |
|---|---|---|---|---|
| 3,555,719 A | * | 1/1971 | Butler | A01K 97/10 248/530 |
| 4,353,182 A | | 10/1982 | Junkas | |
| 4,747,490 A | | 5/1988 | Smith | |
| 4,841,660 A | * | 6/1989 | James | A01K 97/06 224/244 |
| 4,855,881 A | * | 8/1989 | Pence | A45C 15/06 362/154 |
| 5,257,169 A | * | 10/1993 | Walendziak | A45C 15/06 126/213 |
| 5,347,746 A | * | 9/1994 | Letson | A01K 97/06 206/315.11 |
| 5,685,421 A | * | 11/1997 | Gilmore | A45C 15/06 16/405 |
| 5,879,072 A | * | 3/1999 | Huang | B25H 3/02 362/156 |
| 5,938,023 A | * | 8/1999 | Herron | A01K 97/06 206/315.11 |
| 6,370,810 B1 | | 4/2002 | Widerman | |
| 6,701,995 B1 | * | 3/2004 | Bogdanski | B60R 5/047 16/111.1 |
| 6,802,150 B2 | * | 10/2004 | Harden | A01K 97/10 43/21.2 |
| 7,621,073 B2 | * | 11/2009 | O'Keeffe | A01K 97/06 43/25.2 |

\* cited by examiner

*Primary Examiner* — Chun Cheung
*Assistant Examiner* — Brijesh V. Patel
(74) *Attorney, Agent, or Firm* — Quarles & Brady LLP

(57) ABSTRACT

Some embodiments provide a container and retaining system that includes a container including a top surface. A retaining apparatus is coupled to the top surface of the container, wherein the retaining apparatus is configured to retain an elongate object. A handle is rotatably coupled to the top surface of the container, wherein the handle is positionable in a first handle position and a second handle position when the retaining apparatus retains the elongate object.

19 Claims, 8 Drawing Sheets

US 10,039,274 B2

CONTAINER AND RETAINING SYSTEM

BACKGROUND

The transportation of tools or recreational items may be difficult or cumbersome at times. Larger or awkwardly shaped items do not always lend themselves to storage or transportation in combination with smaller items that need to be used in conjunction with or around the larger or awkwardly shaped items. Transporting a larger item that is not suited for a container may result in the larger item being misplaced or getting left behind. Significant amounts of time may be lost looking for misplaced items or having to return for an item left behind.

Small tasks or activities may only require a small tool box with supplies and a larger item that will not fit in the small tool box. Items such as a medium sized hammer, a framing square, or a level may be too large or may take up too much space inside smaller tool boxes. Further, a person may want to organize and/or transport small parts required for a hobby activity while still having a large or medium sized tool or required piece of equipment that is not easy to transport.

A fishing rod is not an item that may be normally stored within a tackle box and a user carrying the fishing rod and the tackle box may have a difficult time carrying any other supplies needed. Further, transporting supplies and equipment to a fishing location may require traveling through wooded areas or over terrain that does not invite multiple trips for supplies.

Some storage and transportation solutions known in the art have attempted to overcome these difficulties in a variety of ways. One method is to include a handle coupled to a container having retention means for a fishing rod built into the handle. This method unfortunately does not allow the handle to be repositionable while transporting the fishing rod. Another deficiency is that the weight of the fishing rod will cause the handle to tip over and pin the fishing rod against the lid of the container. Another solution utilizes padded locking clips that completely encircle portions of the fishing rod. This method requires complex locking clips that must be secured or released sequentially to mount or retrieve the fishing rod.

Therefore, there is a need for a storage and transportation system capable of storing and transporting a large or awkwardly shaped tool that is positioned in such a way so as to not interfere with the carrying handle, while at the same time allowing for easy and quick insertion and removal. There is also a need for a storage and transportation system that is able to function as a fishing rod holder while the fishing rod is being used.

SUMMARY

Some embodiments provide a container and retaining system that includes a container having a top surface. A retaining apparatus is coupled to the top surface of the container, wherein the retaining apparatus is configured to retain an elongate object. A handle is rotatably coupled to the top surface of the container, wherein the handle is positionable in a first handle position and a second handle position when the retaining apparatus retains the elongate object.

Some other embodiments provide a container and retaining system. The system includes a container having a lid and a base, wherein the container defines an interior volume. A retaining apparatus is coupled to the lid of the container, wherein the retaining apparatus is configured to retain an elongate object. A handle is rotatably coupled to the lid of the container, wherein the handle is positionable in a first handle position and a second handle position, and wherein the handle includes handle axle portions configured to cooperate with at least a portion of both of the lid and the retaining apparatus to couple the retaining apparatus to the lid.

Still further embodiments include a method of securing an object to a container. The method includes the steps of providing a container having a base and a lid with a rotatable handle, providing a retaining apparatus that includes a plurality of retaining arms, and securing the retaining apparatus to the lid adjacent the handle. The method further includes the steps of positioning the object adjacent the plurality of retaining arms, applying a downward force on the object causing the object to contact the plurality of retaining arms and deflect outwardly, and releasing the force on the object to cause the retaining arms to move inwardly to contact the object.

These and other aspects of the invention will become apparent in light of the following detailed description.

DETAILED DESCRIPTION

Figure 1:
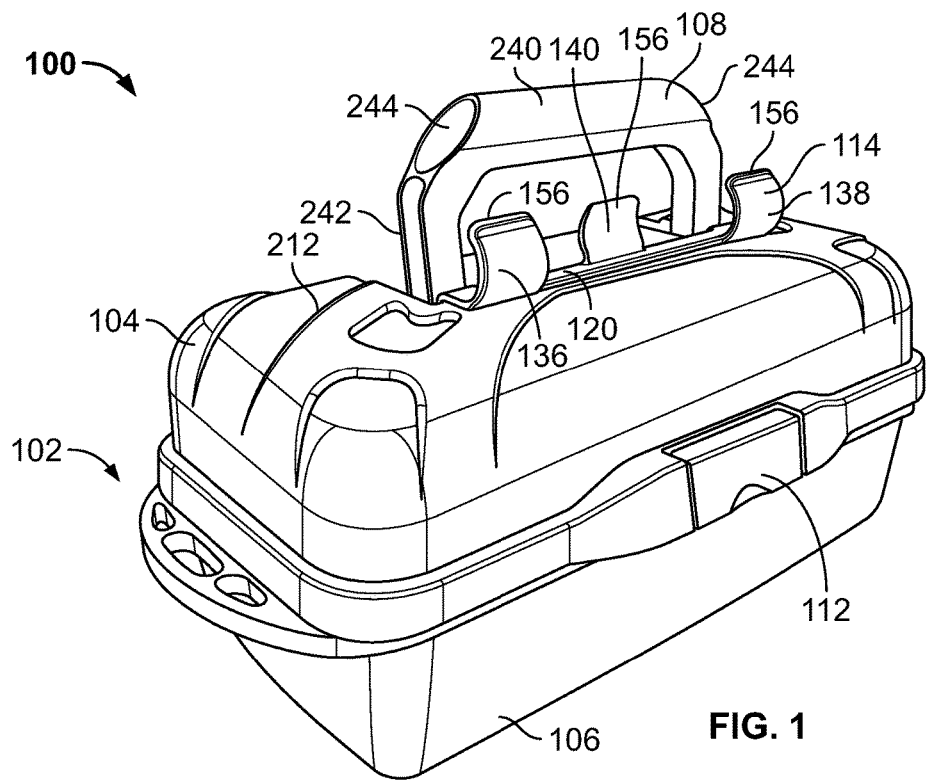
FIG. 1 is an isometric view of a container and retaining system according to one embodiment with a handle in a first configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIGS. 1-4 illustrate a container and retaining system 100 according to one embodiment of the invention. The container and retaining system 100 includes a container 102 provided in the form of a substantially rectilinear box having a lid 104 and a base 106 that supports the lid 104. The lid 104 and the base 106 define a space (not shown) designed to hold a variety of items. The lid 104 includes a rotatable handle 108 that is depicted in a first position in FIGS. 1 and 2, and in a second position in FIGS. 3 and 4. The lid 104 is rotatably coupled to the base 106 by a hinge mechanism 110 disposed on a side of the container 102. The container 102 further includes a hasp or locking mechanism 112 that allows the lid 104 to be releasably locked to the container 102.

The container and retaining system 100 also includes a retaining apparatus 114 coupled to the lid 104 of the container 102. The embodiment of the container and retaining system 100 depicted herein is designed to be used as a tackle box for fishing equipment. The retaining apparatus 114 is configured in the present embodiment to retain an elongate object such as a fishing rod 116 (see FIG. 14). It is contemplated that the elongate object may include at least one dimension that prevents the elongate object from being stored within the space defined by the lid 104 and the base 106. In one embodiment, the container 102 and the retaining apparatus 114 may be sold together. In another embodiment, the container 102 and retaining apparatus 114 may be sold as separate individual components.

In the present embodiment, the container 102 may be about 12 to about 14 inches long, about 6 inches tall, and about 7 inches deep. In some embodiments the container 102 may be larger or smaller as necessary depending on the intended function of the container 102 and the size or quantity of items to be placed inside. The shape of the container 102 is not limited to the embodiment depicted in FIGS. 1-14, but may take any shape that is possible or useful for the task or function of the container 102. One having ordinary skill in the art would understand the different shapes possible for the container 102 configured for different activities and tasks. In the present embodiment, the container 102 may be constructed out of injected molded plastics. In other embodiments, the container 102 may be constructed from other types of materials, such as, wood, metal, and numerous types of synthetic materials. It is also contemplated that the handle 108 and the retaining apparatus 114 may be constructed from numerous types of materials as well. In some embodiments, the components of the container and retaining system 100 may all be constructed of the same or similar materials (e.g., injected molded plastics). In other embodiments, it is contemplated that the container 102 may be metal while the handle 108 and the retaining apparatus 114 may be synthetic materials. One having ordinary skill in the art would understand that different materials may be utilized for different components of the container and retaining system 100 as required by the expected application.

Now referring to FIGS. 5-8, the retaining apparatus 114 is depicted. The retaining apparatus 114 includes a base member 120 having a first surface 122 and an opposing second surface 124. The base member 120 further includes a first side 126 and an opposing second side 128. The base member 120 defines a plane that includes a longitudinal axis 130 (see FIG. 7) of the base member 120 and the first side 126 and the second side 128 are generally parallel to the longitudinal axis 130 of the base member 120. A first end 132 and an opposed second end 134 of the base member 120 are generally perpendicular to the longitudinal axis 130.

Figure 5:
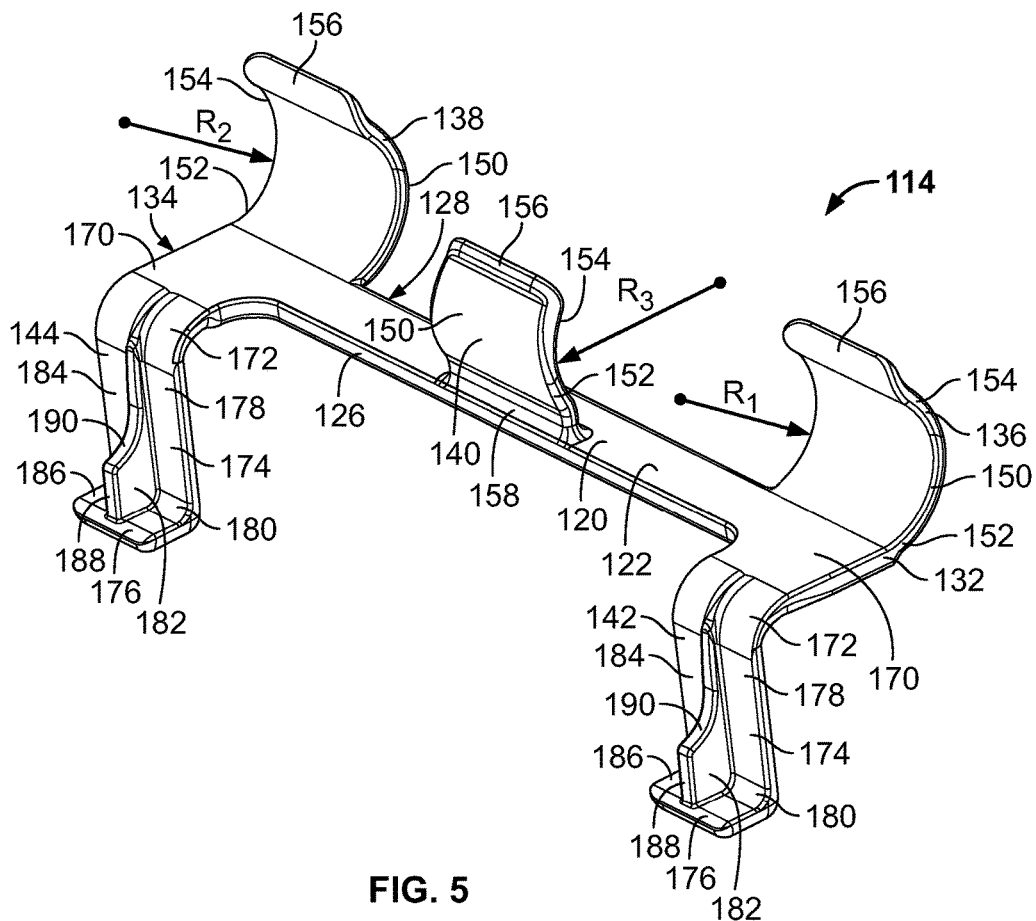
FIG. 5 is an isometric view of an embodiment of the retaining apparatus of the container and retaining system of FIG. 1.
Figure 6:
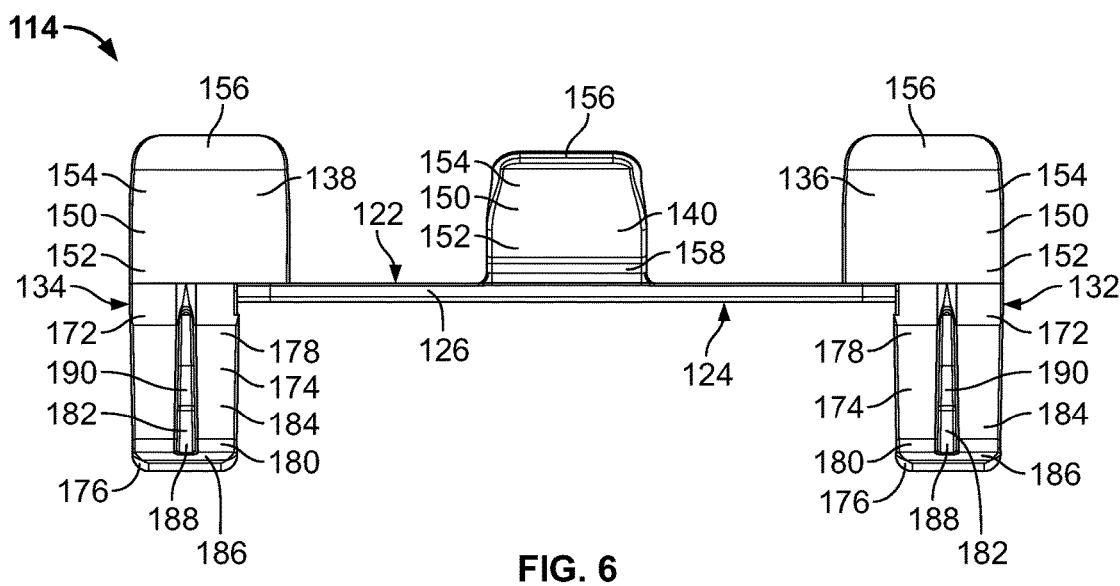
FIG. 6 is a front elevational view of the retaining apparatus of FIG. 5.
Figure 7:
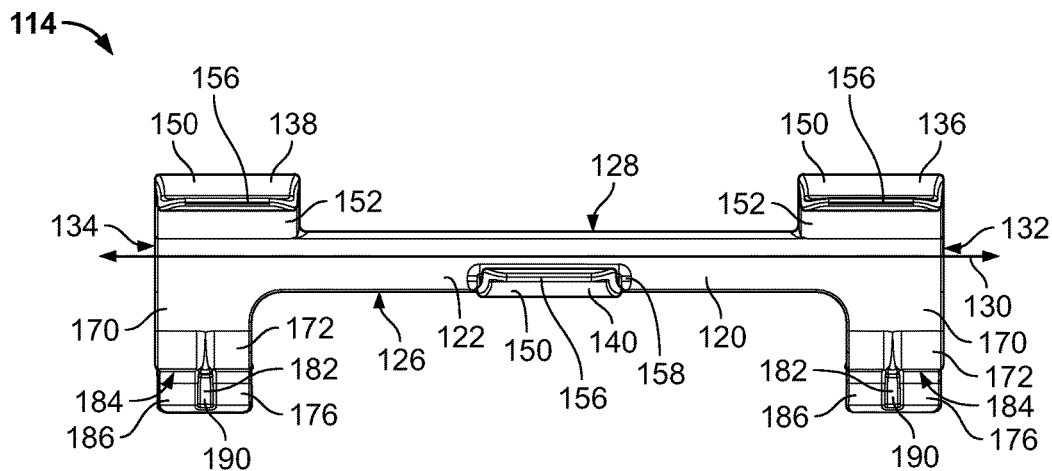
FIG. 7 is a top plan view of the retaining apparatus of FIG. 5.
Figure 8:
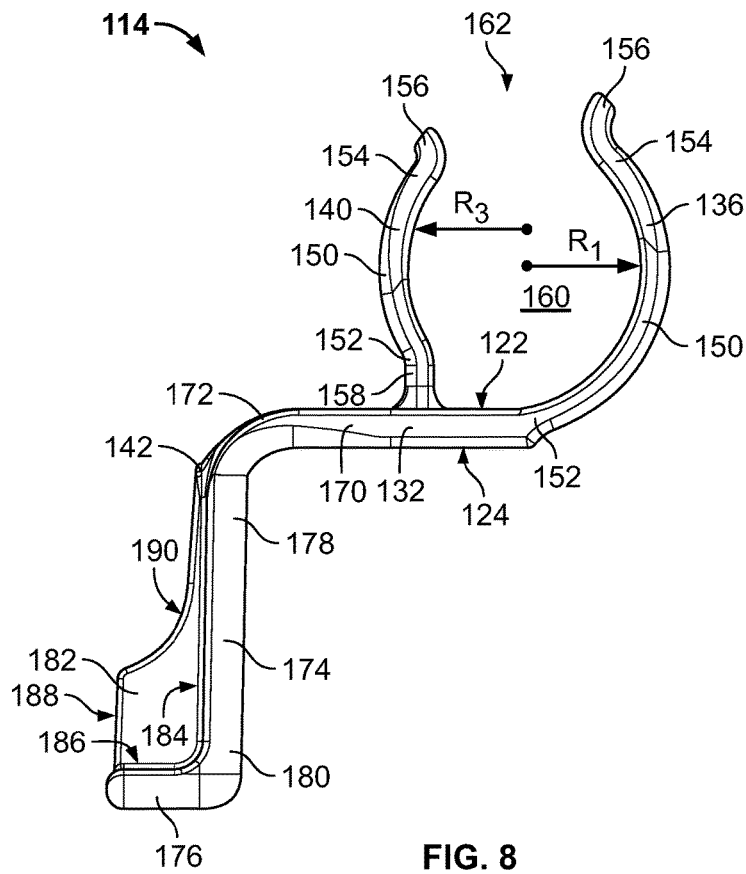
FIG. 8 is a side elevational view of the of the retaining apparatus of FIG. 5.

A securement mechanism in the form of one or more retaining arms is provided on the base member 120. As shown in FIG. 5, a first retaining arm 136 and a second retaining arm 138 protrude upwardly from the second side 128 of the base member 120. A third retaining arm 140 is disposed between the first retaining arm 136 and the second retaining arm 138 and extends upwardly from the first surface 122 adjacent the first side 126 of the base member 120. Additionally, a first coupling member 142 and a second coupling member 144 protrude downwardly from the first side 126 of the base member 120. The retaining arms 136, 138, 140 are designed to act as securement mechanism for an object retained by the container and retaining system 100.

As depicted in FIGS. 5-8, the first, second, and third retaining arms 136, 138, 140 comprise the primary method by which the retaining apparatus 114 retains an elongate object such as the fishing rod 116. The first retaining arm 136 and the second retaining arm 138 each include a curved section 150 and are coupled to the base member 120 at bottom portions 152 of the curved section 150. Each curved section 150 extends upwardly and terminates at an upper portion 154 having a deflection member 156 extending therefrom. The third retaining arm 140 also includes a curved section 150 having a bottom portion 152 and an upper portion 154. A deflection member 156 also extends from the upper portion 154 of the curved section 150 of the third retaining arm 140. A substantially flat flange portion 158 couples the third retaining arm 140 to the first surface 122 of base member 120. The flange portion 158 of the third retaining arm 140 projects substantially perpendicular from the first surface 122 of the base member 120.

The curved portions 150 of the first retaining arm 136 and the second retaining arm 138 open toward the third retaining arm 140. Likewise, the curved section 150 of the third retaining arm 140 opens in an opposite direction toward the first retaining arm 136 and the second retaining arm 138. A retention volume 160 (see FIG. 8) is generally defined by the first surface 122 of the base member 120 and the curved portions 150 of the first retaining arm 136, the second retaining arm 138, and the third retaining arm 140. An entrance aperture 162 is generally defined by the deflection members 156 of the first retaining arm 136, the second retaining arm 138, and the third retaining arm 140.

It is contemplated that the defection members 156 may be flat and angled away from the entrance aperture 162 in some embodiments. Alternatively, as depicted in the present embodiment, the deflection members 156 may be curved. The shape and/or configuration of the deflection members 156 is contemplated as assisting in the insertion and retention of an elongate object into the retention volume 160. Furthermore, it is contemplated that the curvature of the curved portions 150 may be configured to accept different sized objects. The curved section 150 of the first retaining arm 136 may be at least partially defined by a radius of curvature $R_1$ (see FIG. 8). Likewise, the curved portions 150 of the second retaining arm 138 and the third retaining arm 140 may be at least partially defined by the radiuses $R_2$ and $R_3$, respectively. It is contemplated that the radiuses $R_1$, $R_2$, and $R_3$ may all be equal in one embodiment. In other embodiments the radiuses $R_1$, $R_2$, and $R_3$ may all be different. It is also contemplated that the connection of the deflection members 156 to the upper portions 154 of the curved portions 150 may be in the form of an inflection point (i.e., where the curve of the curved portions 150 fluidly transitions into the curve of the deflection member 156). Alternatively, in some embodiments, the transitions from the curved portions 150 to the deflection members 156 may be sharp and distinct. One having ordinary skill in the art would understand that changing the configuration or dimensions of one or more of the retaining arms 136, 138, 140 would allow for the retention of different sized or configured elongate objects (not shown).

Still referring to FIGS. 5-8, the first coupling member 142 and the second coupling member 144 extend from the first side 126 of the base member 120 proximate to the first end 132 and the second end 134, respectively, of the base member 120. The first coupling member 142 and the second coupling member 144 each include a horizontal extension portion 170 that protrudes from the first side 126 and connects to curved portions 172. Leg members 174 extend downwardly from each of the curved portions 172 and are generally perpendicular relative to the first surface 122 of the base member 120. Both the first coupling member 142 and the second coupling member 144 further include foot portions 176 that extend from the leg members 174. The leg members 174 are connected to the curved portions 172 at upper ends 178 of the leg members 174. The foot portions 176 connect to the leg members 174 at lower ends 180 of the leg members 174.

The first coupling member 142 and the second coupling member 144 each include a generally rectilinear coupling flange 182 that extends from front surfaces 184 of the leg members 174 and top surfaces 186 of the foot portions 176. Each coupling flange 182 includes a mating surface 188 that is substantially parallel to the front surface 184 of each of the leg members 174. The front surfaces 184 and the mating surfaces 188 of the first coupling member 142 and the second coupling member 144 are substantially perpendicular to the first surface 122 of the base member 120. Each coupling flange 182 also includes a curved coupling surface 190, the function of which will be discussed later. Generally, the curved coupling surface 190 may be used with features of the container 102, which will be described below, to couple the retaining apparatus 114 to the container 102.

It is also contemplated that the configuration and arrangement of the retaining arms 136, 138, 140 may be adjusted for retention of different items or tools. In some embodiments there may be more retaining arms. For example, there may be opposed pairs of retaining arms distributed along the length of the base member 120. In other embodiments, a single pair of opposed retaining arms may be located on the base member 120. In the present embodiment, the retaining arms 136, 138, 140 are disposed along the base member 120 in a staggered configuration. It is also contemplated that in some embodiments with more retaining arms the staggered arrangement could continue to facilitate retention of larger or heavier items or tools.

Figure 9:
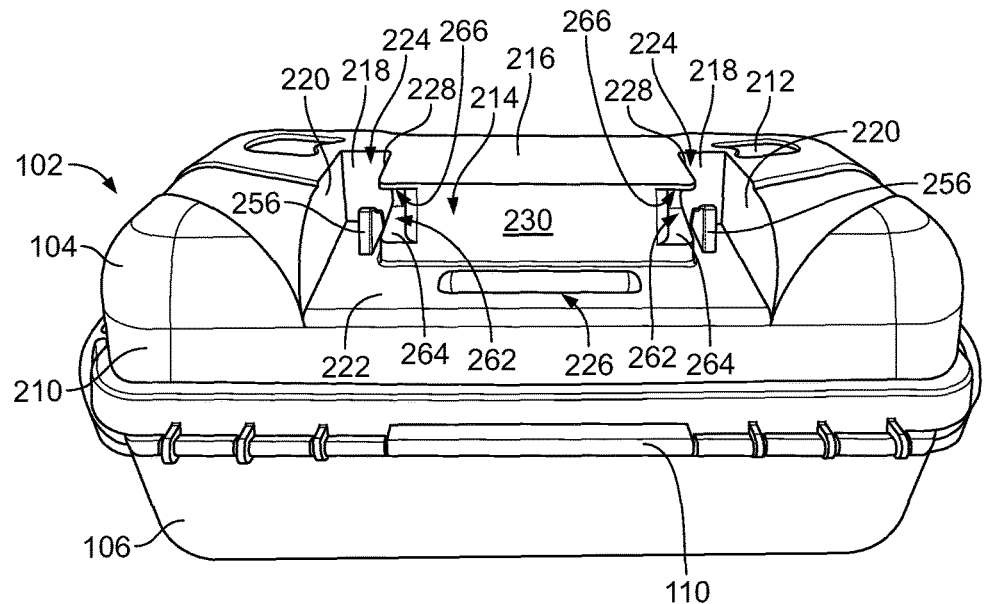
FIG. 9 is a rear isometric view of the container of the container and retaining system of FIG. 1 with the handle and retaining apparatus removed.
Figure 10:
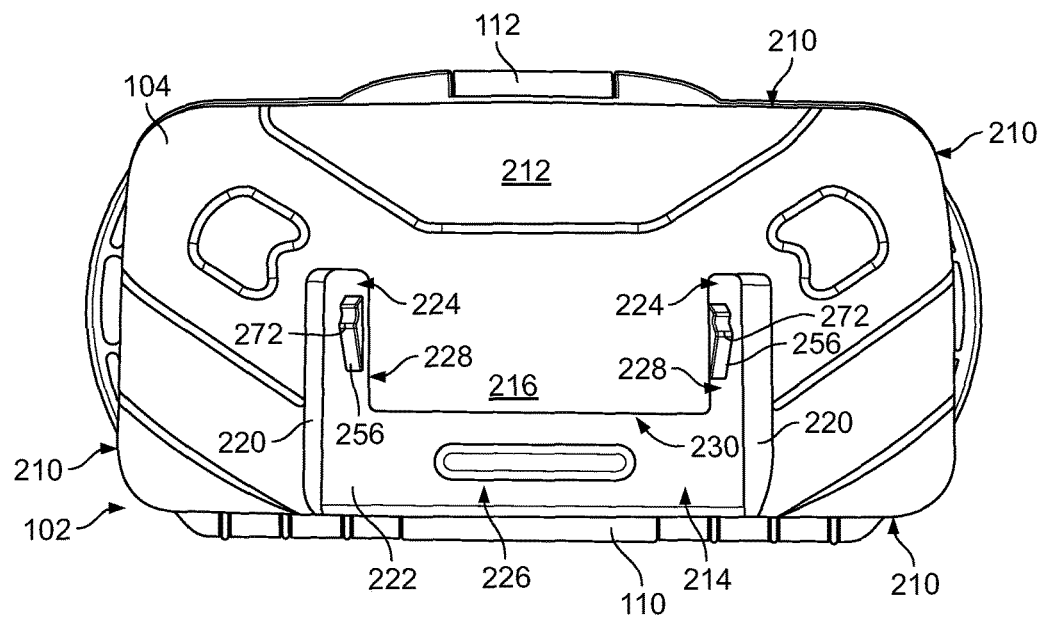
FIG. 10 is a top plan view of the container of the container and retaining system of FIG. 1 with the handle and retaining apparatus removed.
Figure 12:
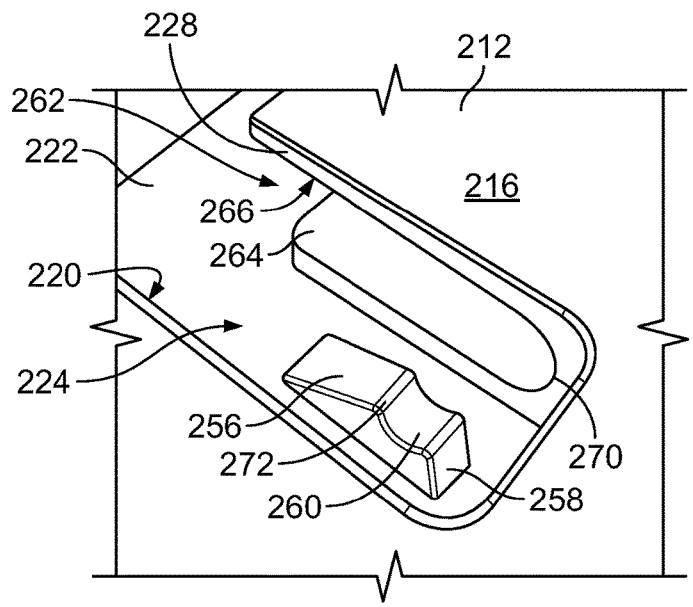
FIG. 12 is a partial isometric view of a portion of the container of FIG. 9.
Figure 13:
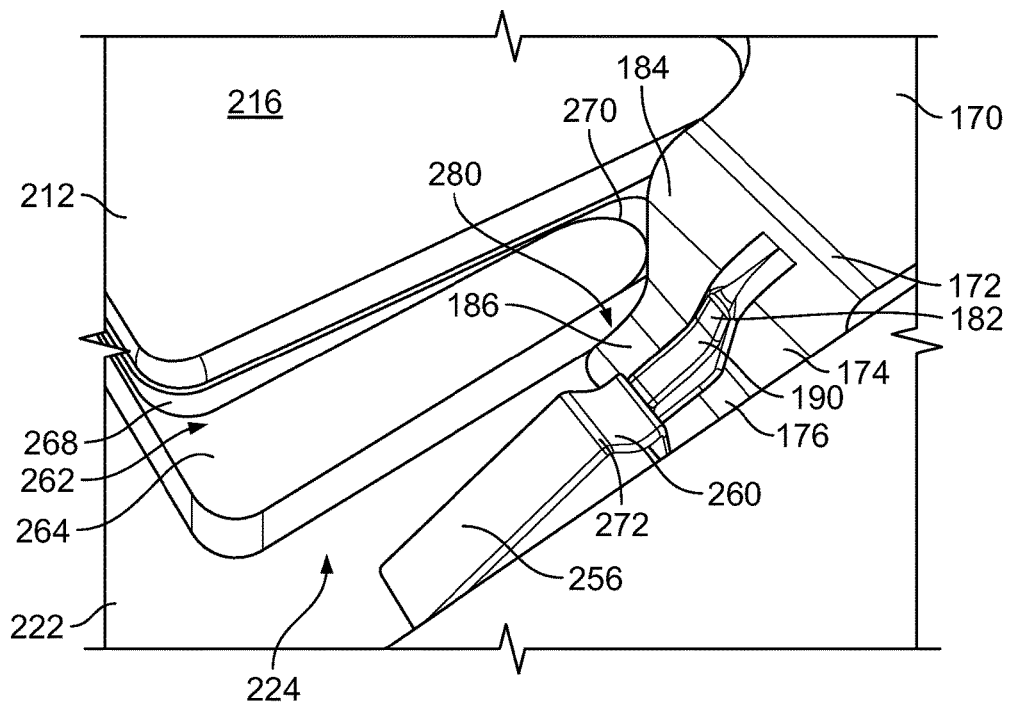
FIG. 13 is another partial isometric view of the portion of the container of FIG. 9 having the retaining apparatus attached, a portion of which is visible.

Now turning to FIGS. 9 and 10, the container 102 is depicted without the handle 108 and the retaining apparatus 114. The lid 104 is defined by exterior sidewalls 210 and a top surface 212. A substantially c-shaped recess 214 is included in the lid 104 and defined by a central portion 216, recess end walls 218, two opposing recess side walls 220, and a substantially flat recess bottom surface 222. The recess 214 further includes two handle retention sections 224 and a handle storage section 226. A close-up view of one of the handle retention sections 224 is depicted in FIGS. 12 and 13. The handle retention sections 224 of the recess 214 are defined by the recess end walls 218, portions of the recess side walls 220 and recess bottom surface 222, and side portions 228 of the central portion 216 of the top surface 212. The handle storage section 226 is defined by portions of the recess side walls 220 and recess bottom surface 222, and a base wall 230 of the central portion 216 of the top surface 212.

Figure 11:
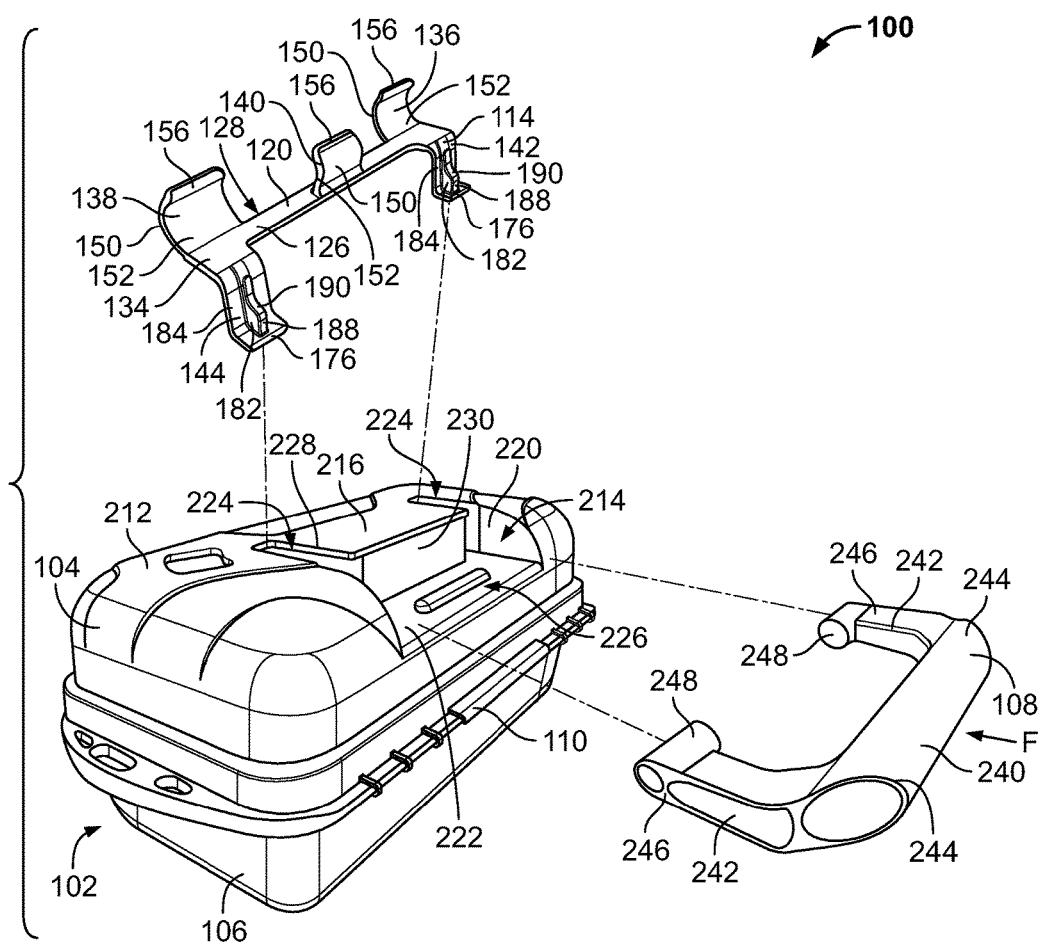
FIG. 11 is an isometric exploded view of the container and retaining system of FIG. 1.

Now turning to FIG. 11, an exploded view of the container and retaining system 100 is depicted. The handle 108 includes a gripping mechanism 240, which is configured to be gripped by a users hand (not shown) to carry the container and retaining system 100. The handle also includes two mounting elements 242 extending from ends 244 of the gripping mechanism 240. Distal ends 246 of the mounting elements 242 are formed into cylindrical axles 248, which extend inwardly toward each other and define an opening sized to receive the central portion 216 so that the axles 248 are positioned in the handle retention sections 224 of the lid 104.

Now turning to FIG. 12, a detailed view of one of the handle retention sections 224 of the recess 214 is depicted. A handle mounting projection 256 extends upwardly in a substantially perpendicular direction from the recess bottom surface 222 and includes a mating surface 258 and a curved axle surface 260. The side portions 228 of the central portion 216 include channels 262 defined by a lower channel wall 264, an upper channel wall 266 (see FIGS. 2 & 9), a side channel wall 268 (see FIG. 13), and a curved channel end wall 270. A peak 272 of the handle mounting projection 256 extends above the lower channel wall 264 (see FIGS. 2 & 9).

Turning now to FIG. 13, another detailed view of one of the handle retention sections 224 is depicted with the first coupling member 142 of the retaining apparatus 114 inserted so that the foot portion 176 is positioned between the handle mounting projection 256 and the recess end wall 218. The mating surface 188 of the coupling flange 182 is proximate to the mating surface 258 of the handle mounting projection 256. The close proximity of the mating surfaces 188, 258 causes an axle pocket 280 to be formed by the curved axle surface 260 of the handle mounting projection 256 and the curved coupling surface 190 of the coupling flange 182.

Referring to FIGS. 11-13, the assembly of the container and retaining system 100 is as follows. The retaining apparatus 114 is positioned such that the first coupling member 142 and the second coupling member 144 extend into the handle retention sections 224 of the recess 214. The foot portions 176 are positioned between the handle mounting projections 256 and the recess end walls 218 so that the mating surface 188 of the coupling flange 182 is proximate to the mating surface 258 of the handle mounting projection 256. The handle 108 is positioned so that the cylindrical axles 248 are positioned within the channels 262. The handle 108 is inserted into the recess 214 until the cylindrical axles 248 contact the handle mounting projections 256. The cylindrical 248 are slightly larger than the clearance between the peak 272 of the handle mounting projection 256 and the upper channel wall 266. Applying a force to the handle gripping mechanism 240 generally in the direction of the F arrow (see FIG. 11) results in the deflection of the upper channel walls 266 and the handle mounting projections 256 to allow the cylindrical axles 248 to be positioned into the axle pockets 280. Once the cylindrical axles 248 are positioned in the axle pockets 280, the upper channel walls 266 and the handle mounting projections 256 will resiliently return to their original positions retaining the cylindrical axles 248 within the axle pockets 280.

Figure 2:
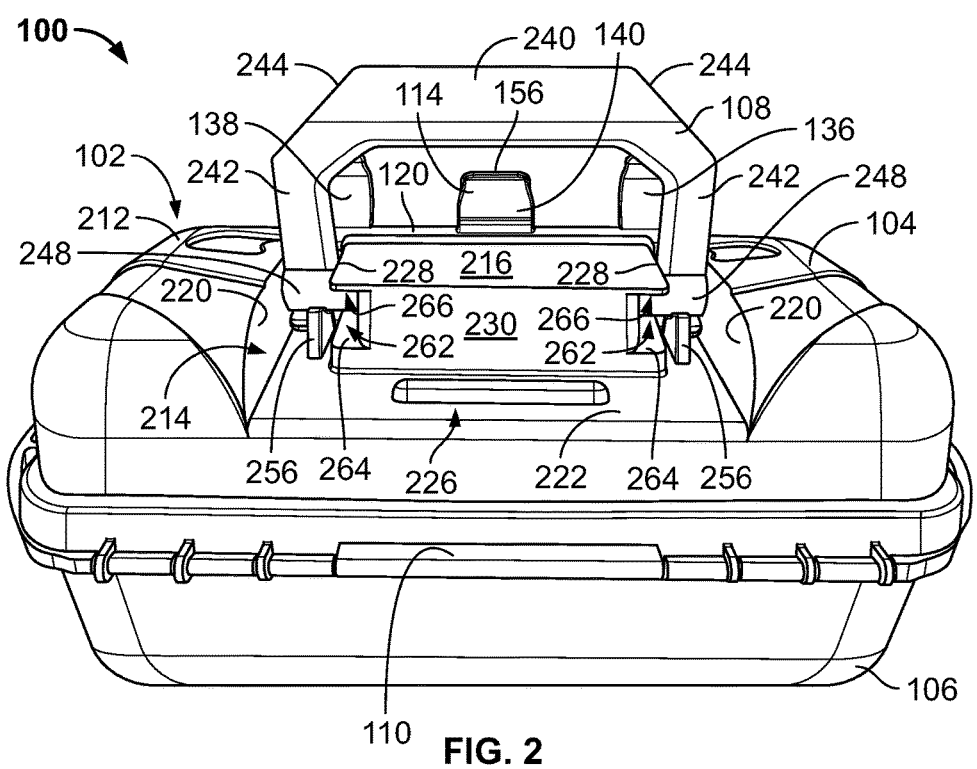
FIG. 2 is a rear isometric view of the container and retaining system of FIG. 1 with the handle in the first configuration.
Figure 3:
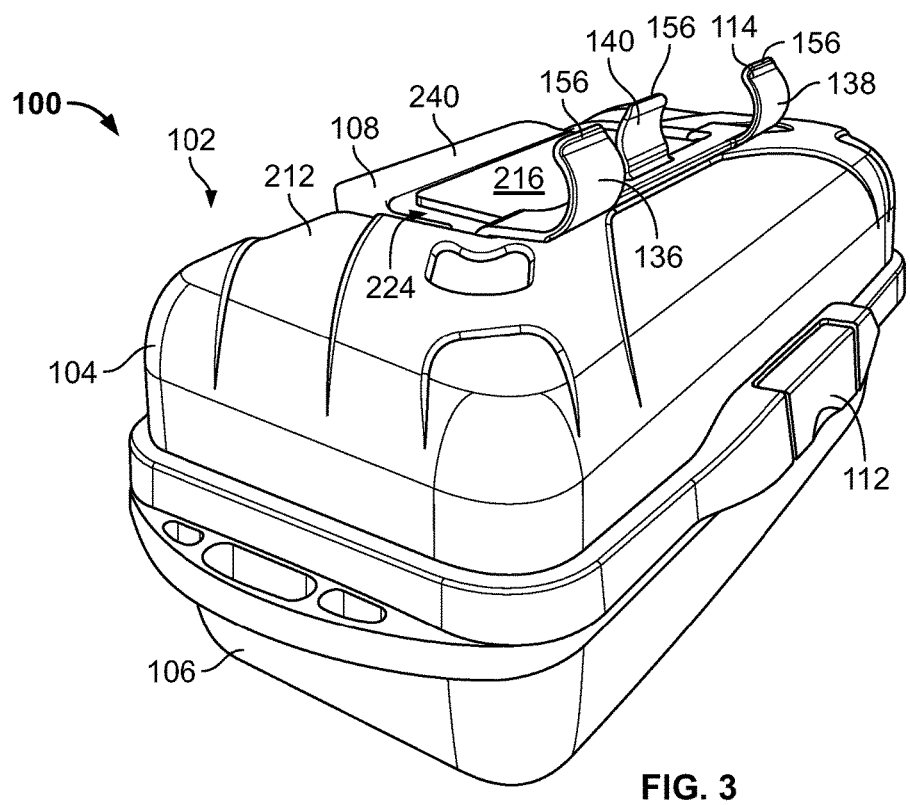
FIG. 3 is a side isometric view of the container and retaining system of FIG. 1 with the handle in a second configuration.
Figure 4:
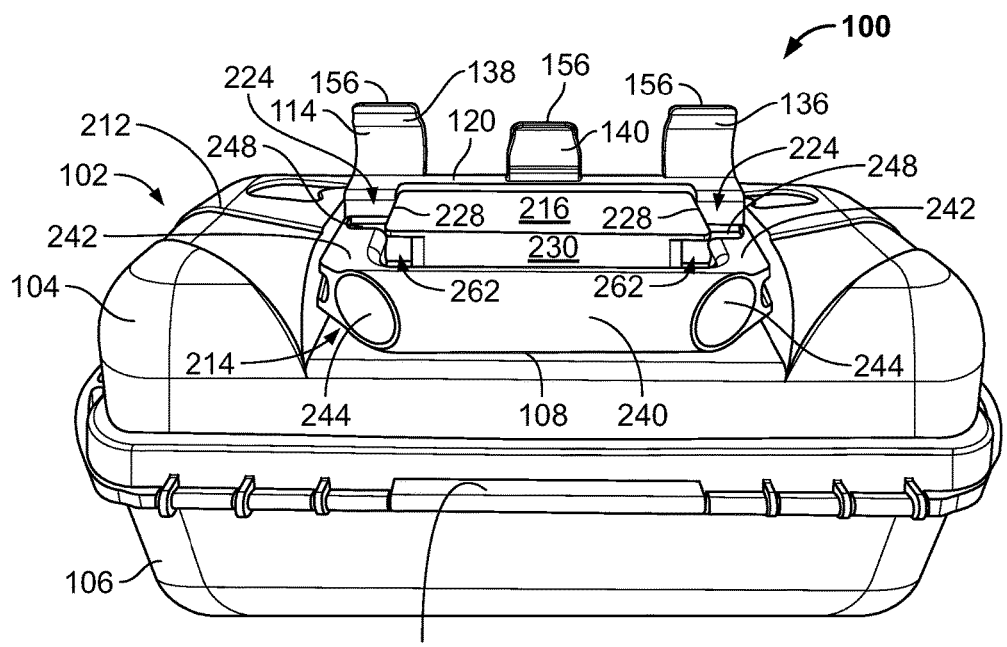
FIG. 4 is rear isometric view of the container and retaining system of FIG. 1 with the handle in the second configuration.

Once the handle 108 has been inserted such that the cylindrical axles 248 are retained in the axle pockets 280, the container and retaining system 100 assembly is complete. The handle 108 may be rotated between a first position as depicted in FIGS. 1 and 2 and a second position as depicted in FIGS. 3 and 4. The first position is primarily a transport position where the handle 108 is substantially upright and allows for a user to grip the handle to transport the container and retaining apparatus system 100. The second position is primarily a storage position for when the handle is not required and is disposed adjacent an upper surface of the lid 104. The retaining apparatus 114 is thereby coupled to the lid 104 by the cylindrical axles 248 position over the curved coupling surfaces 190. The handle 108 may be coupled to the lid 104 even when the retaining apparatus 114 is not installed. The cylindrical axles 248 are constrained within the axle pocket 280 by the curved channel end wall 270, the upper channel wall 266, and the curved axle surface 260 of the handle mounting projection 256. In some embodiments, the retaining apparatus 114 is integral with the container 102, lid 104, and/or handle 108 and is unable to be removed.

Figure 14:
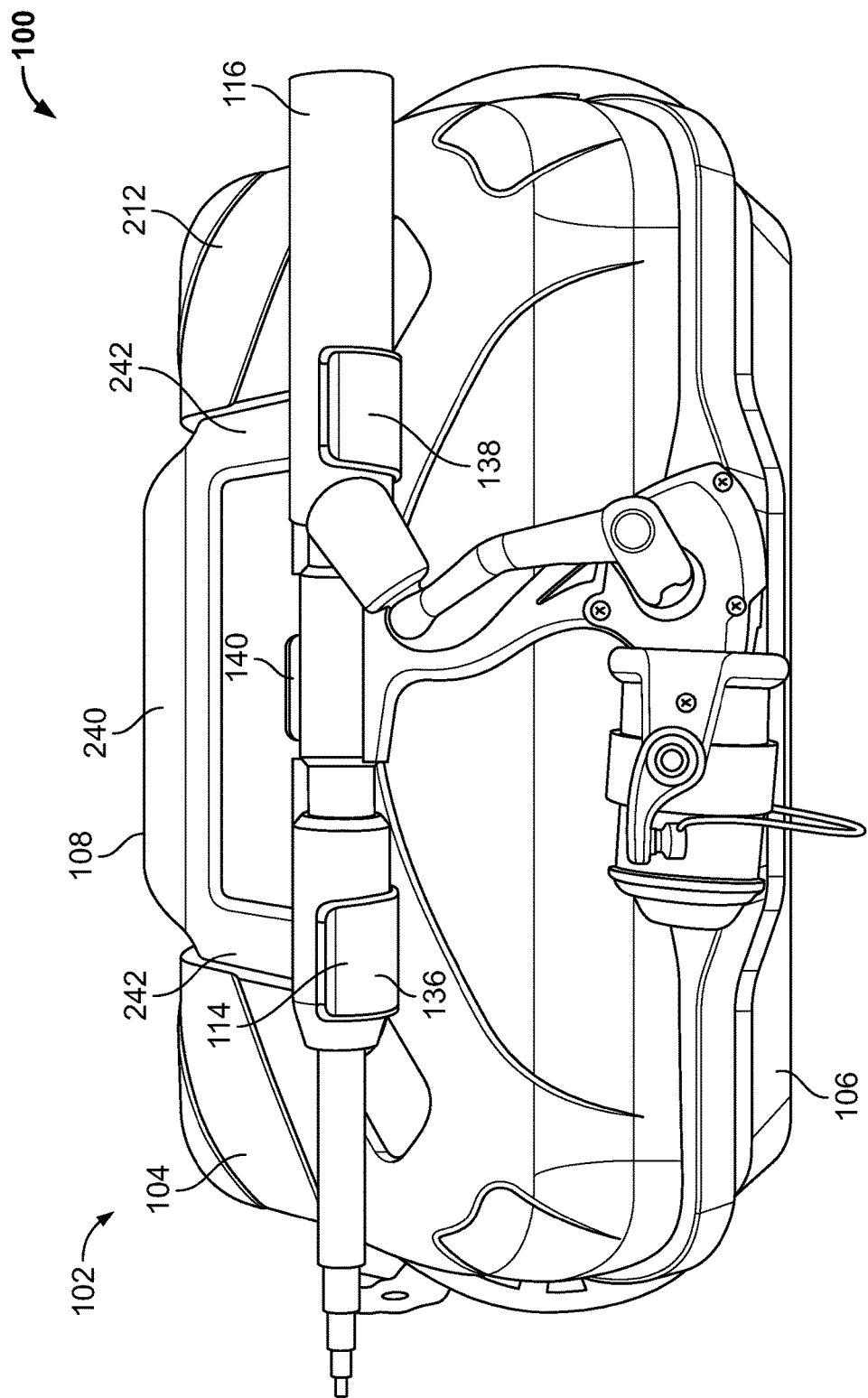
FIG. 14 is an isometric view of the container and retaining system of FIG. 1, with a fishing rod inserted into the retaining apparatus.

Now referring to FIG. 14, the container and retaining system 100 is depicted with a portion of the fishing rod 116 inserted into the retaining apparatus 114. The process of inserting the portion of the fishing rod 116 into the retention volume 160 through entrance aperture 162 is as follows. A user (not shown) presses the portion of fishing rod 116 to be retained against the deflection members 156 of the first retaining arm 136, the second retaining arm 138, and the third retaining arm 140 simultaneously. Applying pressure to the fishing rod 116 will cause one or more of the retaining arms 136, 138, and 140 to elastically deform outwardly away from the retention volume 160. This deflection allows the entrance aperture 162 to enlarge and a portion of the fishing rod 116 passes through the entrance aperture 162 into the retention volume 160. The fishing rod 116 is retained within the retention volume 160 by the first retaining arm 136, the second retaining arm 138, and the third retaining arm 140 resiliently bending and applying pressure to the portions of the fishing rod 116 in contact with the curved sections 150.

It is contemplated that the fishing rod 116 may be removed from the retaining apparatus 114 by the following process. The user presses on the deflection member 156 of the third retaining arm 140 causing the third retaining arm 140 to resiliently bend and reducing the pressure applied to the fishing rod 116. The user then pulls upward with a free hand on the fishing rod 116 causing further resilient bending of the retaining arms 136, 138, and 140 that enlarges the entrance aperture 162 and allows the removal of the fishing rod 116 from the retention volume 160.

It is contemplated that the container and retaining system 100 may be used to transport fishing tackle stored within the container 102 and the fishing rod 116 secured in the retaining apparatus 114. For example, the container and retaining system 100 may be transported by hand from a user's automobile to a fishing location with one hand. The user can then use the other free hand for other items. By having the container and retaining system 100, the user may be capable of easily carrying all the necessary supplies for an enjoyable and productive fishing experience. The container and retaining system 100 may also be used to retain the fishing rod 116 while the user is fishing. After the user has employed the fishing rod 116 to deploy fishing tackle (i.e., a bobber and a fish hook with bait), the user may place the fishing rod 116 back in the retaining apparatus 114 until a fish is attracted by the bait on the hook.

It is also contemplated that the container and retaining system 100 may have different configurations than the embodiment of the present application. In some embodiments, the container 102 may be configured as a bucket having a lid (not shown) and the retaining apparatus 114 may be configured similarly to retain the fishing rod 116. The bucket may be filled with water to act as a live well for bait fish or to keep the fish caught throughout a fishing trip. In some embodiments, the container may be configured as a tool box and the retaining apparatus 114 may be configured to retain a hammer or a level. One having ordinary skill in the art would understand that the container and retaining system 100 may be configured to perform numerous types of storage and retention functions.

It is also contemplated that most or all of the components may be formed by injection molding of synthetic polymer materials. However, it is understood that one or more of the components could be made of different materials or formed by different process. One having ordinary skill in the art would understand the different methods and materials available to manufacture different configurations of the container and retaining apparatus system 100 for the different and varied applications.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A container and retaining system, comprising:
 a container including a top surface defining a recess;
 a retaining apparatus coupled to the top surface of the container, wherein the retaining apparatus is configured to retain an elongate object, and wherein the retaining apparatus includes a base having one or more downwardly protruding coupling members; and a handle rotatably coupled to the top surface of the container, wherein the handle is positionable in a first handle position and a second handle position when the retaining apparatus retains the elongate object, and wherein a portion of the handle retains the one or more downwardly protruding coupling members within the recess, thereby coupling the retaining apparatus to the container.

2. The container and retaining system of claim 1, wherein the first handle position is a configuration for transporting the elongate object.

3. The container and retaining system of claim 1, wherein the first handle position is defined by the handle protruding upwardly in a substantially perpendicular direction with respect to a plane defined by the top surface of the container.

4. The container and retaining system of claim 1, wherein the second handle position is a configuration for storage of the handle during use of the retaining apparatus.

5. The container and retaining system of claim 1, wherein the second handle position is defined by the handle in a substantially flat configuration adjacent the top surface of the container.

6. The container and retaining system of claim 1, wherein the retaining apparatus further includes a plurality of retaining arms extending upwardly from a base member.

7. The container and retaining apparatus system of claim 6, wherein the plurality of retaining arms protrude upwardly away from the top surface of the container.

8. The container and retaining system of claim 6, wherein the plurality of retaining arms are each made of a material that is resiliently flexible.

9. The container and retaining system of claim 6, wherein two retaining arms protrude upwardly from a first side of the base member and one retaining arm protrudes upwardly from a second side of the base member.

10. A container and retaining system, comprising:
a container including a lid and a base, the lid defines a recess, and wherein the container defines an interior volume;
a retaining apparatus coupled to the lid of the container, wherein the retaining apparatus is configured to retain an elongate object; and
a handle rotatably coupled to the lid of the container, wherein the handle is positionable in a first handle position and a second handle position, and
wherein the handle includes handle axle portions that extend from distal ends of the handle and are configured to cooperate with at least a portion of both of the recess of the lid and lower portions of the retaining apparatus to couple the retaining apparatus to the lid; and
wherein cooperating lower portions of the retaining apparatus are positioned between the handle axle portions and cooperating portions of the recess of the lid.

11. The container and retaining system of claim 10, wherein the elongate object includes at least one dimension large enough to prevent storage within the interior volume of the container.

12. The container and retaining system of claim 10, wherein the elongate object is a fishing pole.

13. The container and retaining system of claim 10, wherein the retaining apparatus is removable from lid.

14. The container and retaining system of claim 10, wherein the retaining apparatus includes a plurality of resilient retaining arms protruding upwardly from the lid.

15. A method of securing an object to a container, comprising:
providing a container having a base and a lid with a rotatable handle, wherein the lid defines a recess;
providing a retaining apparatus that includes a base having a plurality of retaining arms that protrude upwardly from the base and one or more downwardly protruding coupling members;
positioning the one or more downwardly protruding coupling members of the retaining apparatus in the recess;
securing the retaining apparatus to the lid by inserting a portion of the rotatable handle into the recess adjacent the one or more downwardly protruding coupling members;
positioning the object adjacent the plurality of retaining arms;
applying a downward force on the object causing the object to contact the plurality of retaining arms and to deflect outwardly; and
releasing the force on the object to cause the plurality of retaining arms to move inwardly to contact the object.

16. The method of claim 15 further including the step of rotating the handle from a first position to a second position while the object is retained within the plurality of retaining arms.

17. The method of claim 15 further including the step of opening the lid while the object is retained within the plurality of retaining arms.

18. The method of claim 15 further including the step of providing three retaining arms on the retaining apparatus.

19. The method of claim 15 further including the step of securing the retaining apparatus to the lid such that the plurality of retaining arms protrude upwardly with respect to the lid.

* * * * *